Patented June 17, 1924.

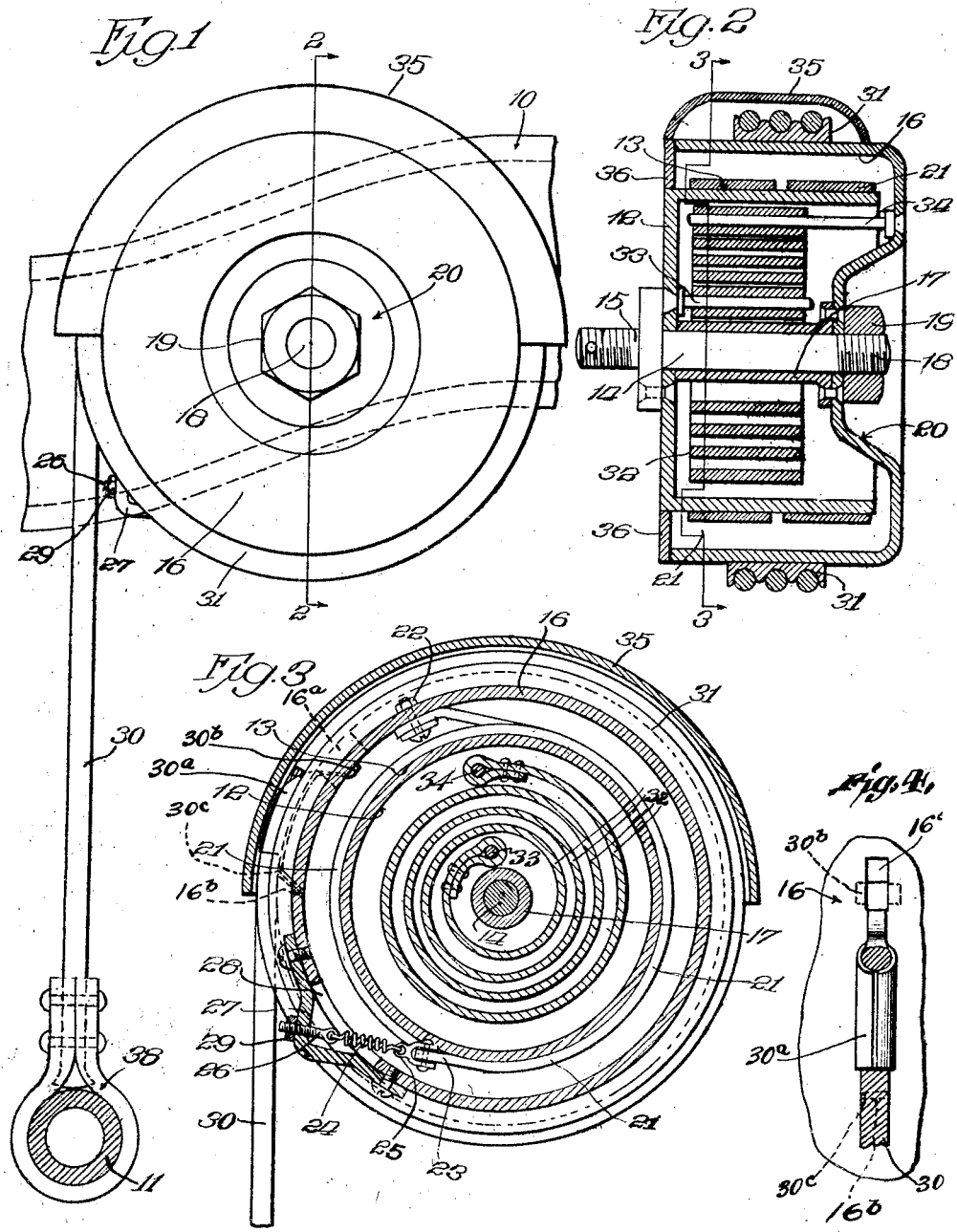

1,498,284

UNITED STATES PATENT OFFICE.

EDWARD L. LEINBACH, OF CHICAGO, ILLINOIS, ASSIGNOR TO GEORGE P. GILMAN, OF CHICAGO, ILLINOIS.

SHOCK ABSORBER.

Application filed March 10, 1919. Serial No. 281,835.

*To all whom it may concern:*

Be it known that I, EDWARD L. LEINBACH, a citizen of the United States, residing at Chicago, in the county of Cook and State of Illinois, have invented certain new and useful Improvements in Shock Absorbers, of which the following is a specification.

This invention relates to improvements in shock absorbers particularly adapted, though not necessarily limited in its use, to be interposed between the axles and body of a vehicle, for the purpose of reducing the extent of vibration or relative movement of the parts, whereby the excessive vibration of the springs and the sudden shock or jolting of the vehicle will be overcome and the life of the parts and structure will be prolonged, with the further advantage of adding to the ease and comfort of the rider.

More specifically, the invention relates to a shock absorber of the friction type in which is employed a friction surface encompassed by a flexible band or strap having both of its ends anchored to an element rotatable about the said friction surface, so that when the element is rotated in one direction with respect to the surface an excessive friction or drag will be exerted by the band or strap upon the said surface to retard the relative movement of the element with respect to the surface and the separating movement of the vehicle body and axles. Provision is made, however, that when the rotatable element starts to revolve in the opposite direction with respect to the said surface, such, for instance, as when the vehicle body and axles are moved one toward the other, either suddenly or otherwise, as when passing over irregularities or depressions in the road bed, the friction or gripping action of the band or belt upon the said friction surface will be relieved sufficiently to permit the rotatable element to revolve freely with respect to the said surface. This is accomplished preferably by causing the band or belt to loosen or slacken about the friction surface, but when the rotatable element starts to revolve in the other direction with respect to the said surface, the belt or band is automatically drawn taut or tightened about the friction surface and the band will exert a friction or gripping action upon the said surface and thereby retard the rotation of the element.

To the attainment of these ends and the accomplishment of other new and useful objects as will appear, the invention consists in the features of novelty in substantially the construction, combination and arrangement of the several parts, hereinafter more fully described and claimed and shown in the accompanying drawing illustrating this invention, and in which—

Figure 1 is a view partly in side elevation and partly in section of a portion of the chassis of a vehicle and axle having a shock absorber constructed in accordance with the principles of this invention applied thereto.

Figure 2 is a sectional view on line 2—2, Figure 1.

Figure 3 is a sectional view taken on line 3—3, Figure 2.

Figure 4 is a detail view showing the manner of anchoring one end of the flexible strap to the drum.

Referring more particularly to the drawing the numeral 10 designates a portion of the chassis of a vehicle and 11 one of the axles and between which and the chassis the shock absorber is preferably arranged. The shock absorber consists essentially of a drum-like structure 12 of cup shape formation, the outer peripheral surface of which consists of a friction surface 13. The element 12 thus constructed is secured to a fixed support to be held against rotation, in any desired or suitable manner such as by means of a fastening bolt 14 which extends into the element 12 to constitute a bearing. The end 15 of the element 14 is preferably threaded as shown and is secured to the chassis 10 for supporting the element 12. The element may be secured to the bolt 14 in any suitable manner so that the former will be held against rotation. A second cup-shape and drum-like structure 16 is also provided and is of an internal diameter somewhat larger than the external diameter of the element 12, the elements 12 and 16 being telescoped with each other, the latter being provided with a hub 17 which extends over the bearing 14, the latter forming a support for the element 16 and about which support the element is rotatable. The extremity 18 of the bearing 14 may be threaded and a nut 19 may be provided on this threaded end for holding the elements 12 and 16 against separation. The element 16 is preferably provided with a recessed portion 20 in its outer face to form a space or cavity in which the nut 19 is located so that it will not project beyond the outer face of the element 16. Interposed between the elements 12 and 16 is a band of flexible friction material 21, which may be of any desired width and constructed of any suitable material. This band 21 is coiled about the friction surface 13 of the element 12 any desired number of times, but preferably substantially once and one half and the friction surface 13 is of a width that the coils or convolutions of the band will not be superposed but will all rest against the friction surface. One end of the band 21 is anchored as at 22 to the element 16 and the other end 23 of the band is also anchored to the element 16 but interposed between the end 23 of the band and the element is an elastic member 24 such as a coil spring. One end of this element 24 is secured as at 25 to the end of the band and connected with the other end of the element 24 is an adjustable element 26 such as an eye bolt, the threaded end of which is adjustably secured to the element 16 in any desired or suitable manner such, for instance, as a bracket 27 arranged adjacent an opening 28 in the element 16. Carried by the threaded extremity of the eye bolt and in a position convenient for access is a nut 29 which rests against the bracket 27 so that by adjusting the nut the tension of the elastic element 24 will be varied. By the provision of the elastic element 24 the element 16 is adapted to be freely rotated in one direction with respect to the element 12 inasmuch as the elastic element 24 will yield sufficiently to permit such movement but when the element 16 is rotated in the opposite direction with respect to the element 12, the elastic element will cause the band 21 to grip or frictionally bind upon the friction surface 13 of the element 12, due to the fact that by such a relative movement of the elements 16—12 the band 21 will be tightly wound upon the surface 13, inasmuch as the element 12 will be held against rotation. But, should the element 16 be rotated in the opposite direction with respect to the element 12, the elastic element 24 constituting a portion of the band 21 will yield and cause the band 21 to release its gripping hold upon the surface 13 of the element 12, so that the element 16 may be freely rotated in that direction.

This relative movement of the elements 12—16 and the operation of the band 21 upon the friction surface 13 overcomes the vibration and sudden shock to the parts and to that end the relative movement may be accomplished in the following manner. A flexible strap or element 30 is provided, one extremity of this strap is anchored to the outer face of the element 16 preferably by means of a clip 30$^a$ secured to the end of the strap in any suitable manner. The clip has a T shaped head 30$^b$ adapted to enter a slot 16$^a$ in the wall of the drum 16, the slot being so disposed that the clip 30$^a$ must be twisted so that the head 30$^b$ will enter the slot and then twisted to extend crosswise of the slot. The clip also has an ear or projection 30$^c$ adapted to be seated in another slot or recess 16$^b$ in the wall of the drum so that when the head 30$^b$ extends across the slot 16$^a$, strain upon the strap 30 will cause the ear or projection 30$^c$ to enter the recess or slot 16$^b$. The strap is adapted to be coiled any desired number of times about the periphery of the element, the element being provided, if desired, with a series of grooves or convolutions 31 to receive the element 30 as it is wound about the element 16. The free end of the element 30 is connected as at 32 with the axle 11. Thus it will be manifest that when the parts 10—11 are separated, the flexible element 30 will be unwound from the element 16 in a direction to cause the friction band 21 to grip the friction surface 13 of the element 12, and when the elements 10—11 are moved toward each other the element 16 will be permitted to rotate in the opposite direction to wind the flexible element 30 upon the element 16. This winding of the element 30 upon the element 16 and the rotation of the latter in a direction to release the friction band 21 is preferably accomplished by means of a spring 32 arranged within the element 12 and coiled about the bearing or axle 17 of the element 16. One end of the spring 32 is anchored to the element 12 in any suitable manner such as by means of an anchoring pin or element 33 to which the end of the spring 32 is connected and which pin in turn is secured to the element 12. A similar anchoring device 34 such as a pin is connected with the other end of the spring 32 and is in turn anchored to the element 16. The spring 32 is coiled in such a manner that when the elements 10—11 are separated and the flexible element 30 is unwound from the element 16 to cause the latter to rotate in one direction, the spring 32 will be wound up or energy will be stored in the spring and this operation occurs at the time that the band 21 is exerting a gripping action upon the surface 13 of the element 12. When the parts 10—11 are moving in a direction toward each other, and at the time that the friction band 21 is released or loosened with respect to the friction surface 13, the energy stored in the spring 32 will cause the latter to rotate the element 16 in the opposite direction or in a direction to wind the element 30 around the element 16. The spring 32 also operates as a means for holding the flexible element taut.

It will therefore be seen that when the drum 16 is rotated in an anti-clockwise direction by the flexible member 30 being unwound therefrom, the elastic portion 24 of the band 21 will cause the band 21 to exert a frictional gripping action between the band 21 and the drum 12, at the same time the spring 32 will be wound up to store energy therein. When the drum 16 is rotated in a clockwise direction or when rotated by the energy of the spring 32 to wind the flexible member 30 upon the drum, the elastic portion 24 of the band 21 will yield to permit a free rotation of the drum 16.

If desired a shield 35 may be provided to extend for any desired distance about the periphery of the element 16 to cover the element 30 when it is wound thereupon and a closure 36 preferably in the form of an annular member is also provided for closing the space between the elements 12 and 16.

With this improved construction it will be manifest that a simple, durable, compact and effective device of this character is provided and all of the operating parts will be housed and protected, yet, it is possible to vary the tension of the elastic member 24 from the outside of the casing without dismantling the parts, so that the tension of the friction band 21 upon the surface 13 may be varied. By protecting all of the parts, it will be manifest that mud or foreign matter cannot find its way into the casing and between the parts which would, if present, seriously interfere with the gripping action of the band and would result in serious injury to the parts.

Obviously the elements 12 and 16 may be constructed of any suitable material and in any manner and may, if desired, each be stamped out of sheet material, thereby reducing considerably the cost of manufacture without in the least impairing the efficiency of the device.

What is claimed as new is:—

1. A shock absorber embodying a pair of spaced and concentrically arranged drum shaped members movable relatively one with relation to the other, one of said members being provided with a friction surface, a flexible friction band encompassing and cooperating with the said surface, the free ends of said band being separately anchored to one of the said members, means whereby the movement of one of the members in one direction with respect to the other member will cause the said band to grip the said surface, and when the movable member is moved in the opposite direction, the grip or friction of the band upon the said surface will be relieved, and a flexible element extending about the movable one of the members to impart motion thereto, one end of the flexible element being secured to the said movable member.

2. A shock absorber embodying a pair of spaced and concentrically arranged drum shaped members movable relatively one with relation to the other, one of said members being provided with a friction surface, a flexible friction band encompassing and cooperating with the said surface, the free ends of said band being separately anchored to one of the said members, means whereby the movement of one of the members in one direction with respect to the other member will cause the said band to grip the said surface, and when the movable member is moved in the opposite direction, the grip or friction of the band upon the said surface will be relieved, a flexible element adapted to be wound about and unwound from the movable one of the members, and means for maintaining the last recited flexible element taut.

3. A shock absorber embodying a pair of spaced and concentrically arranged drum shaped members movable relatively one with relation to the other, one of said members being provided with a friction surface, a flexible friction band encompassing and cooperating with the said surface, the free ends of said band being separately anchored to one of the said members, means whereby the movement of one of the members in one direction with respect to the other member will cause the said band to grip the said surface, and when the movable member is moved in the opposite direction, the grip or friction of the band upon the said surface will be relieved, a flexible element adapted to be wound about and unwound from the movable one of the members, and elastic means interposed between the said pair of members and operating to normally impart a relative movement to the said pair of members in a direction to maintain the said flexible element taut.

4. A shock absorber embodying a pair of spaced and concentrically arranged drum shaped members movable relatively one with relation to the other, one of said members being provided with a friction surface, a flexible friction band encompassing and cooperating with said surface, the free ends of said band being separately anchored to one of the members, means whereby the movement of one of the said members in one direction with respect to the other will cause the band to grip the friction surface, and when the movable member is moved in the opposite direction the grip or friction of the band upon the surface will be relieved, a flexible element encompassing the movable member for actuating the same with respect to the other member, a coiled spring intermediate the members, and means whereby the movement of the movable member in one direction will store energy in the spring, said spring operating normally to hold the flexible element taut and also operating in one direction to wind the flexible element about the said movable member.

5. A shock absorber embodying a friction surface, a flexible friction band wound about said surface, a rotatable member and to which member the free ends of the flexible band are separately connected, means whereby the rotation of the said member in one direction will cause the band to grip said surface, and the rotation of the member in the opposite direction will relieve the grip or friction, a flexible element for rotating the said member in one direction to cause the band to become active, and an elastic element tending normally to rotate the member in the opposite direction and against the stress of which elastic element the said member is actuated by the said flexible element.

6. A shock absorber embodying a friction surface, a flexible friction band wound about said surface, a rotatable member and to which member the free ends of the flexible band are separately connected, means whereby the rotation of the said member in one direction will cause the band to grip said surface, and the rotation of the member in the opposite direction will relieve the grip or friction, a flexible element wound about the said member and adapted when unwound to rotate the member in one direction to cause the band to become active, and an elastic element tending normally to rotate the member in the opposite direction and against the stress of which elastic element the said member is rotated by the said flexible element, the said elastic element also operating to maintain the said flexible element taut.

7. A shock absorber embodying a friction surface, a flexible friction band wound about said surface, a rotatable member and to which member the ends of the flexible band are connected, means whereby the rotation of the said member in one direction will cause the band to grip said surface, and the rotation of the member in the opposite direction will relieve the grip or friction, a flexible element wound about the said member, and a coil spring between the said member and surface, said flexible element being adapted to be unwound from the member to rotate the member in one direction and wind up the said spring, said spring when released operating to wind the flexible element about the said member and maintain the flexible element taut.

8. A shock absorber embodying a friction surface, a flexible friction band wound about said surface, a rotatable member and to which member the ends of the flexible band are connected, means whereby the rotation of the said member in one direction will cause the band to grip said surface, and the rotation of the member in the opposite direction will relieve the grip or friction, means for rotating the said member in one direction to cause the band to become active, and means tending normally to rotate the member in the opposite direction, the first said means embodying an elastic section, as a component part of the said friction band.

9. A shock absorber embodying a friction surface, a flexible friction band wound about said surface, a rotatable member and to which member the ends of the flexible band are connected, means whereby the rotation of the said member in one direction will cause the band to grip said surface, and the rotation of the member in the opposite direction will relieve the grip or friction, means for rotating the said member in one direction to cause the band to become active, and means tending normally to rotate the member in the opposite direction, the first recited means embodying an expansible and contractible portion as a component part of the band, and means for varying the tension of the said portion.

10. A shock absorber embodying a friction surface, a flexible friction band wound about said surface, a member rotatable forwardly and backwardly and to which member the free ends of the flexible band are separately connected, means whereby the rotation of the said member in one direction will cause the band to grip said surface, and the rotation of the member in the opposite direction will relieve the grip or friction, means for rotating the said member in one direction to cause the band to become active, and means for rotating the member in the opposite direction and against the stress of which last recited means the said member is moved by the second recited means.

11. In a shock absorber, the combination of a rotary drum, a relatively stationary drum, means for rotating the rotary drum in one direction, means for reversing the direction of rotation of the rotary drum, and a friction band wrapped around the stationary drum and attached to the rotary drum to rotate therewith and in such manner that its friction with the stationary drum will cause it to contract when rotated by the first named means and to expand when rotated by the second named means.

12. In a shock absorber, the combination of a rotary drum, a relatively stationary drum, means for rotating the rotary drum in one direction, means for reversing the direction of rotation of the rotary drum, a friction band wrapped around the stationary drum and attached to the rotary drum to rotate therewith and in such manner that its friction with the stationary drum will cause it to contract when rotated by the first named means and to expand when rotated by the second named means, and adjustable means operable at will for contracting and expanding said band.

13. In a shock absorber, the combination of a rotary drum, a relatively stationary drum, means for rotating the rotary drum in one direction, means for reversing the direction of rotation of the rotary drum, a friction band wrapped around the stationary drum and attached to the rotary drum to rotate therewith and in such manner that its friction with the stationary drum will cause it to contract when rotated by the first named means and to expand when rotated by the second named means, and yielding connections between said band and rotary drum acting to tighten said band upon the stationary drum.

14. A shock absorber comprising a rotary drum, means for rotating the drum in one direction, separate means for rotating the drum in the opposite direction, a relatively stationary drum, a band attaching device mounted on the rotary drum, and a friction band having one end attached to said device, and its remaining portion wound around the stationary drum and attached to said rotary drum whereby the friction between the band and stationary drum will cause said band to tighten upon the stationary drum when the rotary drum is actuated by the first named means, and to loosen upon the stationary drum when the rotary drum is actuated by the second named means.

15. In a shock absorber, the combination of a rotary drum, means for rotating said drum in one direction, a relatively stationary drum, coil spring connections between the stationary drum and rotary drum for driving said rotary drum in the opposite direction, an adjusting screw connected with the rotary drum tangential thereto, a spring having one end connected with the screw, and a brake band having one end attached to the other end of the spring and its remaining portion wrapped around the stationary drum and attached to the rotary drum.

16. The combination of a body frame and axle of a road vehicle, a relatively stationary friction drum secured to the frame, a rotary drum coaxial with the friction drum, connections between the rotary drum and axle for rotating said drum in one direction when the frame and axle move away from each other, spring connections between the drums for returning the rotary drum when the frame and axle move toward each other, a band attaching device on the rotary drum, and a friction band attached to said device and wound around the stationary drum in the direction of rotation of the rotary drum by its connections with said axle and attached to said rotary drum.

17. In combination with a body frame and axle of a road vehicle, a relatively stationary brake drum, means including a stud for clamping the drum to the frame, a rotary drum journaled on said stud and having a portion thereof extending centrally into the stationary drum, and another portion thereof surrounding the periphery thereof in spaced relation thereto, connections between the periphery of the rotary drum and axle for rotating said drum as the frame and axle are moved away from each other, a coil spring between and connected to the inner portion of the rotary drum and stationary drum for returning said rotary drum when the frame and axle move toward each other, a screw connected with the rotary drum tangential thereto, a nut connected by said screw, a spring connected with the screw, and a friction band wrapped around the stationary drum and having one end attached to said spring and its other end secured to the rotary drum.

18. In a shock absorber, frictionally engaged members, one member being wrapped around the other member, a rotating support for the wrapped member, including yielding means for exerting a tightening effect of the wrapped member upon the other member, and means rotating said support, the friction between the wrapped member and the other member acting to tighten the wrapped member upon the other member when the support is rotated in one direction.

19. In a shock absorber, frictionally engaged members, one member being wrapped around the other member, a rotating support for the wrapped member, including yielding means for exerting a tightening effect of the wrapped member upon the other member, means for rotating said support, the friction between the wrapped member and the other member acting to tighten the wrapped member upon the other when the support is rotated in one direction, and to loosen the wrapped member when the rotating member is moved in a reverse direction, and means for reversing the direction of movement of said rotating member.

20. A shock absorber embodying a friction drum, a flexible friction band wound about said drum, a rotatable member, devices by which the ends of the flexible band are connected to said member whereby the rotation of the said member in one direction will cause the band to grip said drum, and the rotation of the member in the opposite direction will relieve the grip or friction, a flexible element wound about said member, and a coil spring connected to and between the said member and drum, said flexible element being adapted to be unwound from the member to rotate the member in one direction and to wind up the said spring, said spring when released operating to wind the flexible element about the said member and maintain the flexible element taut.

21. A shock absorber embodying a friction surface, a flexible friction band wound about said surface, a rotatable member, devices by which the ends of the flexible band are connected to said member whereby the rotation of the said member in one direction will cause the band to grip said surface and the rotation of the member in the opposite direction will relieve the grip or friction, means for rotating the said member in one direction to cause the band to become active, and means tending normally to rotate the member in the opposite direction, one of said devices embodying an elastic section to take up slack of the said friction band.

In testimony whereof I have signed my name to this specification, on this 8th day of March, A. D. 1919.

E. L. LEINBACH.